Figure 1:
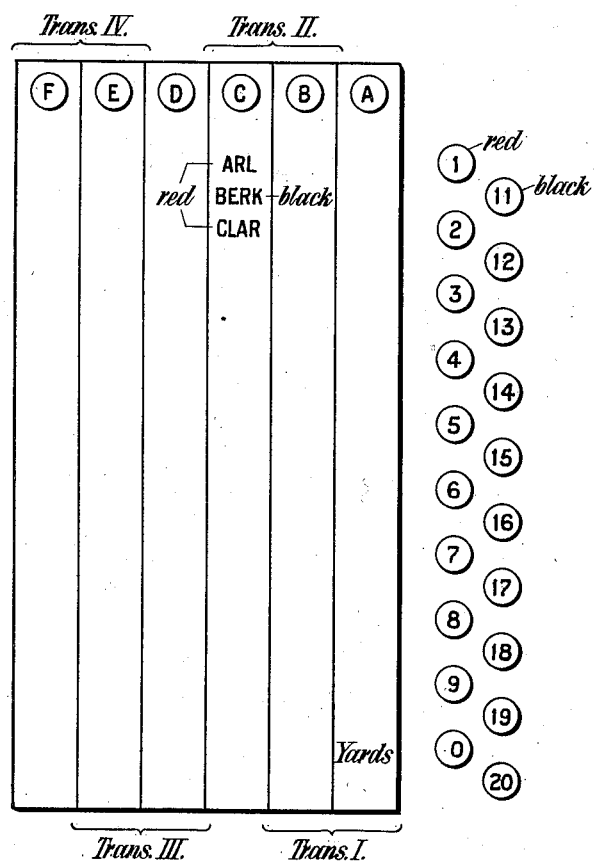

W. G. BLAUVELT.
SEMIMECHANICAL SWITCHBOARD.
APPLICATION FILED JAN. 29, 1919.

1,369,003.

Patented Feb. 22, 1921.
3 SHEETS—SHEET 2.

INVENTOR.
W. G. Blauvelt
BY
ATTORNEY

UNITED STATES PATENT OFFICE.

WILLIAM G. BLAUVELT, OF NEW YORK, N. Y., ASSIGNOR TO AMERICAN TELEPHONE AND TELEGRAPH COMPANY, A CORPORATION OF NEW YORK.

SEMIMECHANICAL SWITCHBOARD.

1,369,003.      Specification of Letters Patent.      Patented Feb. 22, 1921.

Application filed January 29, 1919. Serial No. 273,794.

*To all whom it may concern:*

Be it known that I, WILLIAM G. BLAUVELT, residing at New York, in the county of New York and State of New York, have invented certain Improvements in Semimechanical Switchboards, of which the following is a specification.

This invention relates to semi-mechanical switching systems, and more particularly to office keyboard arrangements for such systems.

In semi-mechanical switching systems employing the well-known panel type of switch, the operator is provided with a keyboard containing in addition to the thousands, hundreds, tens and units keys a set of office keys comprising one key for each office, for the purpose of controlling the establishment of trunking connections to the office in which a called subscriber's line terminates. In the operation of such systems, the actuation of an office key directly or indirectly controls five contacts in order to determine the district brush, district group, office brush, office group, and the class of the call; that is, whether the call is to a call indicator office, to a semi-mechanical office, to an automatic trunk, etc. It is necessary to be able to cross connect these five points so that the arrangement of the trunks on district and office selectors may be changed at any time, and so that the class may also be changed. It must also be possible to change the position of the keys on the keyboard so as to introduce in their proper alphabetical order any new office keys which may be added.

In view of the above requirements it has not been feasible to provide in the keyboard five make contacts for each office key, consequently the office keys have been arranged to set remote stepping devices termed "translators". These translators have five brushes available to make the necessary five contacts, and preferably each translator is capable of stepping over 30 points so that it can handle 30 offices. By making the holding time of each translator comparatively short, only one set of translators need be provided per position; that is, if 30 offices were to be handled from one position, one translator per position would be supplied. If 60 offices were to be handled, two translators would be supplied, etc. The translator, after having been set on the proper point, is arranged to make the five connections noted above. The translator brushes, upon making these connections, are attached to the registers of the sender involved, and after the sender registers have been set by pulses from common sources capable of being cross connected to the translator points, the translator is released for further calls at that position.

Where a large number of offices are involved, the system above described becomes cumbersome for the reason that the number of keys required occupied an unduly large amount of space at the keyboard. In accordance with the present invention, it is proposed to reduce the amount of space required for keys by providing two sets of keys, the total number of which shall be less than the number of offices served, and so arranging the connections of the keys that the translating operations incident to setting up a call to any office may be performed by actuating a combination of keys in the two sets. In the preferred form of the invention the office names which heretofore have been assigned to individual keys may be arranged in vertical and horizontal rows upon a portion of the space heretofore occupied by the keys. Two sets of keys will then be provided, one set comprising keys individual to each vertical row of names, and the other set comprising keys individual to each horizontal row. In order to set up a call to a given office, it is merely necessary to actuate the keys corresponding to the horizontal and vertical rows in which that office name is located. In order to further reduce the space required, one or both sets of keys may be arranged in two rows staggered with respect to each other. To assist the operator in actuating the right keys alternate office names may be printed in different colors, and the keys in the two staggered rows may be correspondingly colored.

As a further refinement, the translating apparatus associated with the keyboard may be so arranged that the keys in one of the groups may individually correspond to certain offices which are more frequently called than others. Each key in this group may then be designated by an office name, and upon the actuation of one of these keys, without previously actuating the key in the other group, the translating apparatus will be actuated to initiate operations incident to setting up a call to the office corresponding to the actuated key.

The arrangement proposed in accordance with this invention has for one of its advantages the reduction in the space occupied by the office keyboard. By staggering one set of keys, the space required for the office keyboard will be reduced approximately one-half, and by staggering both sets of keys, the space occupied may be reduced by approximately one-quarter of that originally required. This results in a considerable saving in cost and maintenance expense on account of the fact that the number of keys and contacts and the number of wires are materially reduced. For example, if it were necessary to provide for 400 offices, in accordance with the usual practice 400 office keys would be required (assuming space for them could be found); whereas the same number of offices could be reached with the proposed arrangement by the use of only 40 keys.

A further advantage resides in the fact that the number of offices which it is possible to provide for in accordance with the proposed plan is so large that the tandem code keys can in some cases be omitted. It was formerly necessary to provide three strips of numbered keys, called tandem code keys, and to assign code numbers to such offices as were infrequently called. The operator was therefore required to memorize these codes or consult a bulletin before completing the call. The code keys are supplied both to save expense for keys and also because space in the keyboard was not available to provide one key per office.

Figure 25:
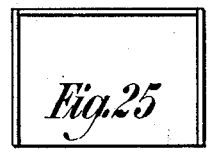
Figure 26:
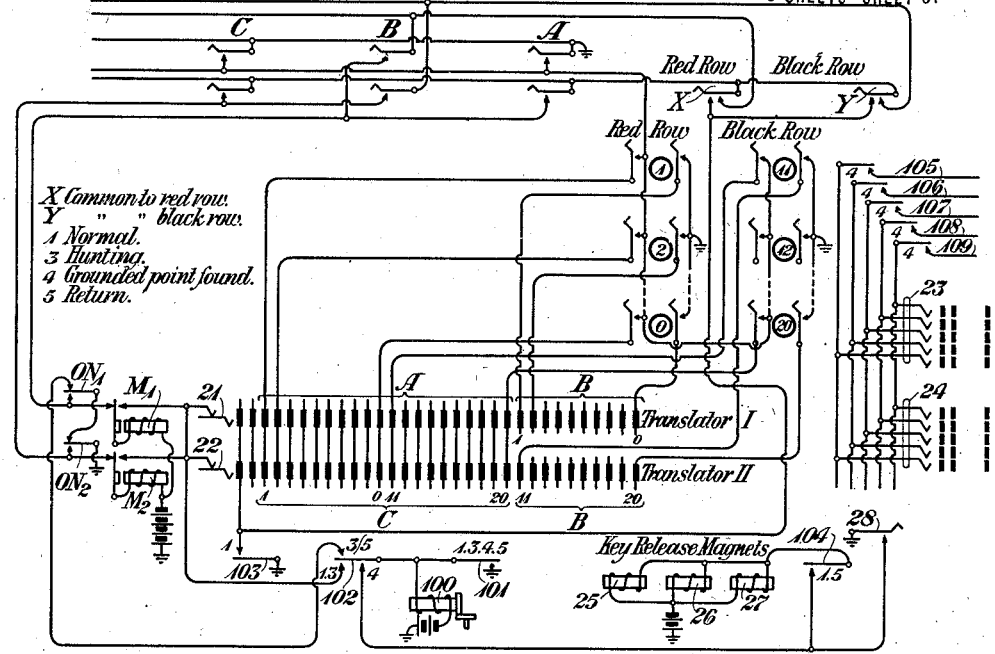
Figure 27:
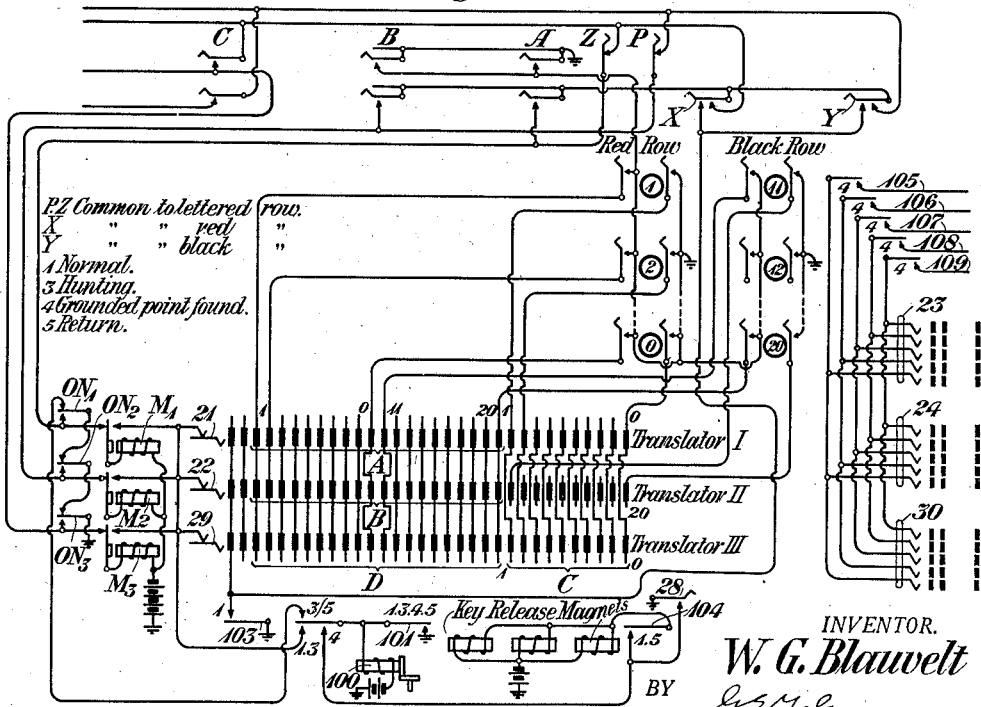

The invention may now be more fully understood by reference to the following detailed description when read in connection with the accompanying drawings, in which Figure 1 illustrates the preferred arrangement of the keys of the office keyboard, Figs. 2 to 25 inclusive indicate schematically alternative arrangements of the office keys, and Figs. 26 and 27 constitute circuit diagrams of two forms of the translating arrangements employed in connection with the keyboard arrangement of Fig. 1.

Referring to Fig. 1, which shows a preferred arrangement of the office keyboard, the office names are printed in vertical columns at the head of each of which is a key, the keys of the various columns being lettered as indicated. The office names in the several columns are also arranged in horizontal rows, and opposite each horizontal row of names is a corresponding numbered key. The numbered keys are arranged in two vertical rows, the keys in one row being staggered with respect to those of the other, so that the amount of space required by the whole keyboard is substantially half of that required for an office keyboard employing one key for each office. When the operator desires to establish a call to an office, such as Berkley, for instance, she will actuate lettered key C at the head of the column in which Berkley is located, and the key numbered 11 at the right of the horizontal row in which Berkley occurs. To further assist the operator in operating the proper numbered key, alternate office names in each vertical column are printed in different colors, as, for instance, red and black, and the corresponding numbered keys are likewise colored as indicated, so that the operator, in calling Berkley, will observe that it is printed in black, and will actuate the nearest black numbered key, which in this case is the key numbered 11.

Figure 2:
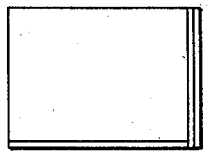
Figure 3:
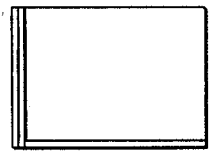
Figure 4:
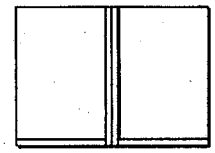
Figure 5:
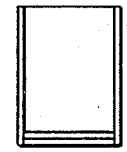
Figure 6:
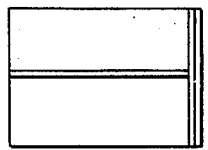
Figure 7:
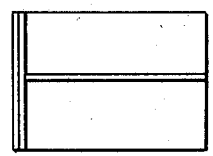
Figure 8:
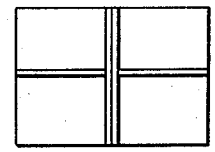
Figure 9:
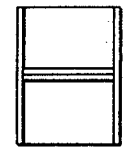
Figure 10:
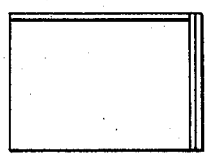
Figure 11:
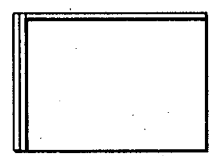
Figure 12:
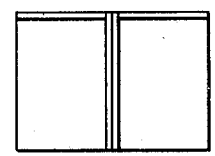
Figure 13:
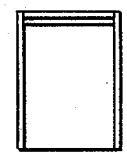
Figure 14:
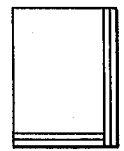
Figure 15:
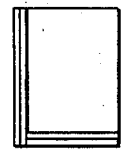
Figure 16:
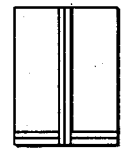
Figure 17:
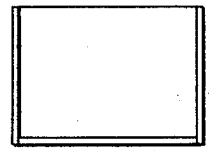
Figure 18:
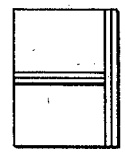
Figure 19:
Figure 20:
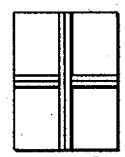
Figure 21:
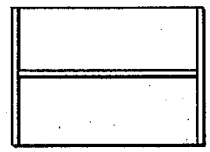
Figure 22:
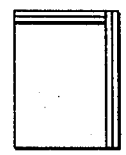
Figure 23:
Figure 24:
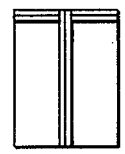

In Figs. 2 to 26 inclusive, a number of alternative arrangements of the keys are schematically illustrated. In these figures the vertical and horizontal strips represent strips of keys and the large blank spaces represent the spaces in which the columns of office names are to be located. Thus in Fig. 2 two strips of keys are arranged at the right of the space occupied by office names, and one strip of keys at the bottom. The keys in the two strips at the right on this figure would, of course, be staggered with respect to each other. The arrangement of Fig. 3 differs from that of Fig. 2 in that the two strips of staggered keys are arranged at the left of the space occupied by the office names. In Fig. 4 these two strips of keys are arranged at the center of the space. In Fig. 6 the two staggered strips of keys are arranged at the right and the one horizontal strip is located in the center of the space. Fig. 7 differs from Fig. 6 in that the two strips of staggered keys are arranged at the left, while in Fig. 8 these two strips are arranged in the center of the space occupied by the names. In Figs. 10, 11 and 12, the two strips of staggered keys occupy the same relative positions as in Figs. 2, 3 and 4 respectively, while the single strip of keys is arranged at the top of the space instead of at the bottom. In Fig. 5 the two vertical strips of staggered keys are arranged at the two sides of the space occupied by the names while the single horizontal strip of keys of Fig. 2 is in Fig. 5 replaced by two horizontal strips of half length, the keys of the two strips being staggered with respect to each other. Fig. 9 is the same arrangement except that the two horizontal strips of staggered keys are arranged at the center of the space instead of at the lower margin. In Fig. 13 these two strips are arranged at the upper margin of the space. In Fig. 14 two vertical strips of staggered keys are arranged at the right and two horizontal strips of staggered keys are arranged at the bottom of the space occupied by the office names. Fig. 15 differs from Fig. 14 in that the vertical strips are arranged at the left. In Fig. 16 the vertical strips are arranged at the center of the space. Figs. 18, 19 and 20 differ from Figs. 14, 15 and 16 respectively in that the two horizontal strips are arranged at the center of the office name space. In a similar manner Figs. 22, 23 and 24 differ from Figs. 14, 15 and 16 respectively in that the horizontal strips of keys are arranged at the top of the space. Fig. 17 differs from Fig. 2 merely in that the two vertical strips of staggered keys are arranged at the right and left of the space occupied by the office names. Figs. 21 and 25 differ from Fig. 17 in that the horizontal strip is arranged at the center and at the top respectively of the space occupied by the office names. The arrangement of Fig. 10 is the same as that of Fig. 1. Other arrangements than those shown are, of course, possible and are within the scope of this invention. It will be observed by comparing the several arrangements that where but one set of the keys are staggered as in Fig. 2 the office keyboard arrangement occupies substantially half of the space which would be required for a keyboard arrangement employing one key per office. Where both sets of keys are staggered as for instance in Fig. 14, substantially one-fourth of the space is all that is necessary.

Fig. 26 shows one circuit arrangement indicating the manner in which the coördinate keyboard arrangement of the present invention may be used to initiate the translating operations incident to setting up a call to an office. For this purpose "translators" such as shown at I and II are provided, which may comprise step by step switches of any well-known type. As illustrated, these switches are stepped by means of stepping magnets $M_1$ and $M_2$, and each switch is provided with test brushes such as 21 and 22 adapted to successively make contact with a series of 32 test contacts. The sequence of operation of the various circuits is under the control of a sequence switch having a driving magnet 100 and a plurality of contacts such as 101, 102, 103, etc. This sequence switch may be of any desired type but is preferably of the general type disclosed in United States patent to McBerty 1,105,811, August 4, 1914, or United States patent to Reynolds et al. 1,127,808, February 9, 1915. In order to simplify the drawing, the contacts of the sequence switch are not shown in their relative positions, but are arranged irregularly upon the drawing.

When the apparatus is not in use the test brushes of the translators are in a subnormal position, that is, in a position such that they will have to be advanced before resting on the first contact, and in advancing they pass over the test contacts successively. The first two contacts are for purposes of circuit control as will be more clearly pointed out hereinafter. Of the next 20 test contacts of the translator I, one will be grounded upon the actuation of the lettered key A together with some one of the 20 numbered keys in the red and black rows, so that the test brush of the actuated translator will come to rest upon the grounded contact. The remaining 10 test contacts of the translator I are provided with circuit connections whereby they will be grounded upon the actuation of the lettered key B together with some one of the lettered keys in the red row. In a similar manner the last 10 contacts of the second translator are assigned to the letttered key B and the numbered keys in the black row, the remaining 20 contacts of said translator being assigned to the lettered key C and the numbered keys in both the black and red rows.

The translators are also provided with groups of five working brushes as indicated at 23 and 24 which, as the translator switches are advanced, pass over successive groups of five waiting contacts, so that when the test brush of the translator comes to rest upon a given test contact, the working brushes come to rest upon a corresponding set of waiting contacts. These sets of contacts are variably connected so as to produce different settings of the sending registers (not shown) in accordance with the particular combination of office keys operated. The translating circuits over the working brushes of the translator are actually completed in the fourth position of the sequence switch by means of sequence switch contacts 105 to 109 inclusive. The lettered and numbered keys of the office keyboard are arranged to be mechanically locking, and are released by means of release magnets 25, 26 and 27 after the combination determined by the operation of the keys has been registered.

Further details of the apparatus will now be clear from a description of the operation which is as follows: Assuming that it is desired to set up a call to the office whose name appears at the intersection of the "A" column and "O" row, the operator will depress lettered key A and numbered key O. The contacts of key X will be closed by the actuation of key O, the key X being arranged so that it is actuated when any key of the red row is operated. A circuit is now completed from ground over sequence switch contact 103, contacts of key X, lower make contact of key A, back contact of stepping magnet $M_1$ and through the winding of said magnet to battery. Stepping magnet $M_1$ now attracts its armature thereby connecting its winding to the test brush 21 which is in subnormal position, so that its circuit is open, with the consequent falling off of the armature of the stepping magnet. The translator switch is so arranged that it is advanced each time the armature of the stepping magnet falls off. As soon as the translator switch is advanced the off-normal contact $ON_1$ is shifted and a circuit is completed from ground over off-normal switches $ON_2$ and $ON_1$ in series over the back contact of the stepping magnet $M_1$ and through the winding of said magnet to battery. The stepping magnet again attracts its armature thereby completing a holding circuit from ground over sequence switch contact 103, first test contact, brush 21, front contact and winding of stepping magnet $M_1$ to battery. A circuit is also completed from ground, over sequence switch contact 103, first test contact, brush 21, over the lower left hand contact of sequence switch contact 102 and through the motor magnet 100 of the sequence switch to battery. The sequence switch is now advanced to position 3 under the control of the sequence switch contact 101. This operation opens the original controlling circuit of the stepping magnet at sequence switch contact 103 and the stepping magnet is now under the control of a circuit over the off-normal contact $ON_1$. The advancement of the sequence switch to position 3 also opens the holding circuit of the stepping magnet $M_1$ at sequence switch contact 103 so that the armature of the stepping magnet again falls back and the brush 21 engages the second test contact. This contact is not grounded and the switch continues to advance step by step under the control of the circuit over the off-normal contact $ON_1$ until the test brush 21 rests upon the test contact A—O. This test contact is grounded due to the combination of keys actuated and a holding circuit for the stepping magnet $M_1$ is completed from ground over the upper make contact of lettered key A, left hand make contact of numbered key O, test contact A—O, brush 21, front contact and winding of stepping magnet $M_1$ to battery. The translator switch is now maintained in this position and a circuit for the sequence switch is completed from ground over the upper make contact of lettered key A, left hand make contact of numbered key O, test contact A—O, brush 21, lower left hand contact of sequence switch contact 102, through the driving magnet 100 of the sequence switch to battery. The sequence switch is now advanced to position 4, in which position the translating circuits to control the setting of the sender are completed over sequence switch contacts 105 to 109 inclusive, and the five working brushes 23 of translator I.

As soon as the combination determined by the actuation of lettered key A and numbered key O has been registered by the sender, the contact 28 may be actuated either manually by the operator or automatically by means under the control of the sender, so that a circuit is completed from ground over contact 28, lower left hand contact of sequence switch contact 102, and through the winding of motor magnet 100 to battery. The sequence switch is now advanced to position 5 in which position a circuit for the release magnets is completed from ground over contact 28, sequence switch contact 104 and through the release magnets 25, 26 and 27 to battery. The actuation of the release magnets restores keys A, O and X to normal. The restoration of these keys removes the ground from test contact A—O so that the holding circuit of the stepping magnet $M_1$ is open and the translator switch is again advanced step by step until it is rotated into the subnormal position from which it started. In this position off-normal contact $ON_1$ is again shifted so that the control circuit of the stepping magnet $M_1$ is opened and the translator switch remains in the subnormal position. The shifting of the off-normal switch $ON_1$ also completes a circuit from ground, over off-normal switches $ON_2$ and $ON_1$ in series, and over the upper left hand contact of sequence switch contact 102 and through the driving magnet 100 of said sequence switch to battery. The sequence switch is now rotated to its normal position and the apparatus is ready for the registration of another call.

It will be noted that by the actuation of keys A and O in addition to the ground applied to test contact A—O, a ground is applied over the right hand make contact of key O to test contact B—O. This was without effect upon the setting of the translator switch, however, since the switch was brought to rest upon the contact A—O before the second grounded contact was reached and the ground was removed from the second contact as soon as the keys were restored, so that the translator switch was advanced over this contact in its rotation to said normal position.

It will also be noted that the operations above described utilize but five positions of the sequence switch which as ordinarily constructed is provided with 18 positions. In order to utilize at least a portion of the remaining positions of the sequence switch and at the same time slightly reduce the operating period, the contacts made in positions 1 to 5 of the sequence switch may be duplicated in positions 7 to 11 and again in positions 13 to 17, thus causing the sequence switch to advance but a third of a revolution for each call. This can, of course, be done by properly cutting the cams of the sequence switch in a manner well known in the art.

If the office to be called had been that at the intersection of the "B" column and "O" row, the translator I would have been started over a circuit from ground, sequence switch contact 103, right and left hand make contact of key X, upper make contact of key B and over the back contact and through the winding of stepping magnet $M_1$ to battery. In this case ground is not connected to the test contact A—O over the left hand make contact of key O since key B does not connect ground to the left hand contact of key O. Ground is connected, however, over the right hand make contact of key O to test contact B—O as before. The translator switch is therefore advanced and passes over the test contact A—O coming to rest upon the test contact B—O. The remaining operations are similar to those already described.

If, on the other hand, the office corresponding to the actuation of keys B and 20 was to have been called translator II would have been started over a circuit from ground, sequence switch 103, right and left hand make contact of key Y, (which is operated when any key in the black row is actuated), over the lower make contact of key B, over the back contact and through the winding of stepping magnet $M_2$ to battery. Translator II is now advanced under the control of off-normal switch $ON_2$ until brush 22 rests upon contact B—20, thereby registering a different combination upon the sender.

In case keys C and 20 had been actuated, translator II would have been started over a circuit from ground, sequence switch 103, left hand make contact of key Y, lower make contact of key C, through the back contact and through the winding of stepping magnet $M_2$ to battery. The translator switch would now be advanced under the control of off-normal contact $ON_2$ until brush 22 rests upon contact C—20 which is grounded, so that the switch is brought to rest by a holding circuit which may be traced from ground, over the upper make contact of key C, left hand make contact of key 20, test contact C—20, test brush 22, front contact and winding of stepping magnet $M_2$ to battery. The ground applied to test contact B—20 over the right hand make contact of key 20 is ineffective in this instance because the test wiper engages grounded contact C—20 first.

It would be very undesirable to have the circuit so arranged that a false move on the operator's part could cause two translators to be set at the same time, thereby bridging the two translator points together and crossing the circuits to the sending registers. The circuit has, therefore, been arranged to eliminate this possibility as will now be explained.

Assume, for example, that the operator depresses numbered keys 1 and 11 and then depresses lettered key B. Ground from sequence switch contact 103 will be connected over the right and left hand make contacts of key X and the upper make contact of key B to start translator I. Ground will also be connected from sequence switch 103 over the right and left hand make contacts of key Y and lower make contact of key B to start translator II. Stepping magnets $M_1$ and $M_2$ will therefore pull up together, fall back together and pull up again, thus locking themselves temporarily over the test brushes 21 and 22, over the first test contacts and over the sequence switch contact 103 to ground. The sequence switch will now be driven out of position 1 as already described thereby opening contact 103 and removing ground from the holding circuits of the stepping magnets $M_1$ and $M_2$. The armatures of both magnets are therefore retracted advancing the switch to the second test contact which, it will be noted, is left dead. In the meantime both off-normal contacts $ON_1$ and $ON_2$ have been shifted so that stepping magnet $M_2$ of translator II alone will be connected to ground over its back contact. This switch is therefore advanced step by step while translator I remains at rest with the brush 21 on the second test contact. Translator II therefore comes to rest upon test contact B—11. As soon as this combination has been registered over the working brushes 24 the switch 28 is closed to advance the sequence switch to position 5 and operate the release magnets thereby restoring the keys. Translator II is thereupon advanced by the stepping magnet $M_2$ under the control of the off-normal switch $ON_2$ until it comes to rest in subnormal position. Off-normal contact $ON_2$ is at this time shifted to its upper contact and ground is connected over said contact and the lower contact of off-normal switch $ON_1$ to the winding of stepping magnet $M_1$ of the translator I. Translator I is now rotated under the control of off-normal switch $ON_1$ until it is restored to the subnormal position, when the ground is connected over the two off-normal switches $ON_2$ and $ON_1$ and over upper sequence switch contact 102 to drive the sequence switch to normal position.

If the operator should depress lettered key B and numbered key 1, thus starting translator I, and before the translator has come to rest upon the corresponding grounded test contact the operator should depress lettered key C, translator II would not be started. This follows from the fact that the sequence switch has passed out of position 1 and therefore no starting ground for the stepping magnet $M_2$ is furnished at contact 103.

Conditions may arise rendering it desirable to operate two coördinate keys on calls to offices receiving but little traffic, and in addition to provide some direct office keys to handle calls to offices where the traffic is heavy. Such an arrangement would considerably simplify the operator's work, as, under these circumstances but one key need be depressed in the case of a call to an office of the latter kind.

In order to provide for a situation of this character, the circuit may be modified as shown in Fig. 27 so that the red and black keys may be used individually as direct office keys. Each of these keys, in addition to having a number, would also be marked with an office name, and if one of these keys were depressed without actuating a lettered key, the office marked on the key would be reached. If before or at the same time the numbered key were depressed the lettered key should also be actuated, an office would be reached whose name would appear on the chart at the intersection of the vertical column corresponding to the depressed lettered key, and the horizontal row corresponding to the actuated numbered key. The last ten points of translator I, which are marked 1—0, may be utilized for offices reached directly by the actuation of any of the numbered keys in the red row. Similarly the last ten points of translator II may be utilized for offices reached directly by the actuation of keys in the black row. The 20 points marked A—1 to A—20 inclusive of translator I may be used for offices reached by actuation of lettered key A in combination with any one of the numbered keys. Similarly the corresponding 20 points of translator II may be used for offices reached by actuating lettered key B in combination with any of the numbered keys. A third translator III may also be provided, the last ten contacts of which may be utilized for calls of offices corresponding to combinations of lettered key C and the numbered keys in the red row. The 20 points marked D—1 to D—20 inclusive may be used for combinations of an additional key D not shown and numbered keys in the black and red rows. By providing one or more additional translating switches the remaining 10 combinations for key C and combinations for additional lettered keys may be taken care of. The translator III is of course in all respects similar to the other translators, and is provided with stepping magnet $M_3$, test brush 29, working brushes 30 and off-normal contact $ON_3$.

If key number 1 in the red row be actuated alone, translator I will be started over a circuit from ground, sequence switch contact 103, left hand and right hand make contacts of key X, normal contact of key Z, over the back contact and through the winding of stepping maget $M_1$ to battery. Ground is applied over the right hand make contact of key 1 to the first test contact of the last series of 10 contacts of translator I.

Translator I is advanced step by step in a manner similar to that described in connection with Fig. 26 until the brush 21 rests upon the grounded contact, whereupon the switch is brought to rest and a corresponding combination is registered upon the sender by means of circuits completed over the working brushes 23, and a call may therefore be extended to the corresponding office by merely actuating the key 1.

If the operator had actuated numbered key 20, the last test contact of translator II would have been grounded, and said translator would have been started by a circuit from ground over sequence switch contact 103, left hand and right hand contacts of key Y, normal contact of key P, back contact and winding of stepping magnet $M_2$ to battery. The translator II would therefore be advanced until the test brush 22 rested upon the last test contact, thereby completing translating circuits to the registers over the working brushes 24.

If it should be desired to establish a call to an office corresponding to a combination consisting of the lettered key B and numbered key O, upon the actuation of the key B the keys Z and P would be actuated to open their normal contacts, these keys being arranged to have their contacts opened when any lettered key is operated. The actuation of keys B and O establishes a starting circuit for translator II from ground, over sequence switch contact 103, left hand make contact of key X, lower make contact of key B, over the back contact and through the winding of stepping magnet $M_2$ to battery. Ground is applied to test contact B—O over a circuit from ground, upper make contact of key B and left hand make contact of key O. The translator is thereupon brought to rest upon this contact and establishes a corresponding group of translating circuits for the sender registers over the working brushes 24.

In case the lettered key C is operated in combination with numbered key O translator III is started over a circuit from ground, over sequence switch contact 103, left hand and right hand make contacts of key X, upper make contact of key C, over the back contact and through the winding of stepping magnet $M_3$ to battery. Test contact C—O is grounded over the right hand make contact of key O so that the switch is brought to rest upon this contact and translating circuits for the sending registers are completed over the working brushes 30 of the translator.

In both of the last two cases above described the contacts of keys Z and P were opened by the actuation of the lettered key, thereby preventing the establishment of the controlling circuits determined by the numbered keys alone, so that with keys Z and P opened the circuit functions essentially in the same manner as the circuit illustrated in Fig. 26.

While the invention has been illustrated as embodied in certain organizations which are believed to be desirable from a practical standpoint, it will be obvious that the general principles herein disclosed are capable of embodiment in many other forms widely different from those illustrated without departing from the spirit of the invention as defined in the following claims.

What is claimed is:

1. A key board arrangement for the office keys of a semi-mechanical switchboard, comprising two groups of keys, the total number of keys in the two groups being less than the number of offices served, and means jointly controlled by the keys of each group whereby the translating operations incident to setting up a call to a given office may be initiated by the actuation of a key in each group.

2. A key board arrangement for the office keys of a semi-mechanical switchboard, comprising a plurality of office names arranged in vertical and horizontal rows, a key corresponding to each vertical row and a key corresponding to each horizontal row, and means jointly controlled by the keys of the two rows whereby the translating operations incident to setting up a call to a given office may be initiated by the actuation of the keys corresponding to the horizontal and vertical rows in which the office name occurs.

3. A key board arrangement for the office keys of a semi-mechanical switchboard, comprising a plurality of office names arranged in vertical and horizontal rows, and groups of keys so arranged that the individual keys of one group correspond to vertical rows of names and the individual keys of another group correspond to horizontal rows of names, the keys of at least one of the groups being arranged in staggered relation.

4. A key board arrangement for the office keys of a semi-mechanical switchboard, comprising a plurality of office names arranged in vertical and horizontal rows, and groups of keys so arranged that the individual keys of one group correspond to vertical rows of names and the individual keys of another group correspond to horizontal rows of names, the keys of at least one of the groups being arranged in staggered relation, and means jointly controlled by the keys of the groups whereby the operations incident to setting up a call to a given office may be initiated by the actuation of the keys corresponding to the horizontal and vertical rows in which the office name occurs.

5. A key board arrangement for the office keys of a semi-mechanical switchboard, comprising a plurality of keys less in number than the offices served, each office corresponding to a different combination of keys, and means controlled by the keys whereby the translating operations incident to setting up a call to a given office may be initiated by the actuation of the combination of keys corresponding to that office.

6. A key board arrangement for the office keys of a semi-mechanical switchboard, comprising a plurality of office names arranged in vertical and horizontal rows, alternate names in each vertical row being printed in distinctive colors, groups of keys so arranged that the individual keys of one group correspond to vertical rows of names and the individual keys of another group correspond to horizontal rows of names, and alternate keys of the latter group being designated by the distinctive coloring of the office names in the corresponding horizontal row.

7. A key board arrangement for the office keys of a semi-mechanical switchboard, comprising two groups of keys, combinations of keys of the two groups corresponding to certain offices, and keys of one of the groups corresponding individually to other offices, and means whereby when a key of said last mentioned group is actuated alone the translating operations incident to setting up a call to the corresponding office will be initiated, and when said key is actuated after a key of the other group the translating operations incident to setting up a call to another office will be initiated.

8. A key board arrangement for the office keys of a semi-mechanical switchboard, comprising office names arranged in vertical and horizontal rows, a group of keys having each key in the group correspond to a vertical row of names, another group of keys having each key correspond to a horizontal row of names, the keys in one of said groups also corresponding individually to offices not included among said names, and means whereby when a key of said group is actuated the translating operations incident to setting up a call to the office individually corresponding thereto will be initiated, and whereby when said key is actuated after a key in the other group the translating operations incident to setting up a call to the office whose name is common to the corresponding horizontal and vertical rows of names will be initiated.

9. In a semi-mechanical switching system, a key board arrangement comprising two groups of keys, the total number of keys in the two groups being less than the number of offices served, a plurality of offices each corresponding to a combination of keys located in each group, translating switches for initiating the operations incident to setting up calls to different offices, and connections whereby the keys in one group determine which translating switch shall be actuated, and the keys in the other group determine the extent to which the determined switch shall be actuated.

10. In a semi-mechanical switching system, a key board arrangement comprising two groups of keys, the total number of keys in the two groups being less than the number of offices served, a group of offices each of which corresponds to a combination of keys located in each group, another group of offices each of which corresponds individually to one only of the keys of a group, translating switches for initiating the operations incident to setting up calls to different offices, connections whereby the keys in one group determine which translating switch shall be actuated and the keys in the other group determine the extent to which the determined switch shall be actuated, and other connections whereby the keys in one group may determine both the switch to be actuated and the extent of its actuation.

11. In a semi-mechanical switching system, a key board arrangement comprising a plurality of office names arranged in rows extending in two directions at angles with each other, a group of keys each of which corresponds to a row of names extending in one direction, a second group of keys each of which corresponds to a row of names extending in the other direction, translating switches for initiating the operations incident to setting up calls to different offices, each of said switches having a plurality of ranges of actuation, and connections whereby when a certain key of the first group is actuated together with any key of the other group a switch will be actuated within one range, and whereby when another key of the first group is actuated together with keys of the other group the switch will be actuated within another range.

12. In a semi-mechanical switching system, a key board arrangement comprising two groups of keys, the total number of keys in the two groups being less than the number of offices served, a plurality of offices each corresponding to a combination including a key in each group, a plurality of translating switches for initiating the operations incident to setting up calls to different offices, a single translating device responding to the actuation of but one combination of keys at one time, and means whereby when more than one combination of keys are concurrently actuated the setting of more than one translator is prevented.

13. In a semi-mechanical switching system, a key board arrangement comprising two groups of keys, the total number of keys in the two groups being less than the number of offices served, a plurality of offices each corresponding to a combination including a key in each group, a plurality of translating switches for initiating the operations incident to setting up calls to different offices, a single translating device responding to the actuation of but one combination of keys at one time, and means whereby when additional keys are actuated before the translating operations incident to the actuation of a previous combination have been completed no other translators will be actuated.

14. In a semi-mechanical switching system, a key board arrangement comprising two groups of keys, the total number of keys in the two groups being less than the number of offices served, a plurality of offices each corresponding to a combination including a key in each group, a plurality of translating switches for initiating the operations incident to setting up calls to different offices, a single translating device responding to the actuation of but one combination of keys at one time, and means whereby when more than one combination of keys are actuated concurrently the setting of more than one translator is prevented and said translator is set in accordance with the first combination actuated.

15. A key board arrangement for the office keys of a semi-mechanical switchboard, comprising a plurality of keys less in number than the offices served, each office corresponding to a different combination of keys, translating switches for initiating the operations incident to setting up calls to different offices, each of said switches having a plurality of ranges of actuation, and connections whereby in response to the actuation of one combination of keys one of said switches will be actuated within one range, and whereby in response to the actuation of another combination of keys said switch will be actuated within another range.

16. A key board arrangement for the office keys of a semi-mechanical switchboard, comprising two groups of keys, the total number of keys in the two groups being less than the number of offices served, translating switches for initiating the operations incident to setting up calls to different offices, each of said switches having a plurality of ranges of actuation, and connections whereby in response to the actuation of one combination of keys one of said switches will be actuated within one range, and whereby in response to the actuation of another combination of keys said switch will be actuated within another range.

17. A key board arrangement for the office keys of a semi-mechanical switchboard, comprising two groups of keys, the total number of keys in the two groups being less than the number of offices served, translating switches for initiating the operations incident to setting up calls to different offices, each of said switches having a plurality of ranges of actuation, and connections whereby, when a certain key of one of said groups is actuated together with a key of the other group, one of said switches will be actuated within one range, and whereby, when another key of said first group is actuated together with a key of the other group, said switch will be actuated within another range.

18. In a semi-mechanical switching system, a key board arrangement comprising a plurality of office names arranged in rows extending in two directions at angles with each other, a group of keys, each of which corresponds to a row of names extending in one direction, a second group of keys, each of which corresponds to a row of names extending in the other direction, translating switches for initiating the operations incident to setting up calls to different offices, each of said switches having a plurality of ranges of actuation, and connections whereby, when one combination of keys is actuated, one of said switches will be actuated within one range, and whereby, when another combination of keys is actuated, said switch will be actuated within another range.

19. In a semi-mechanical switching system, a key board arrangement comprising a plurality of office names arranged in rows extending in two directions at angles with each other, a group of keys, each of which corresponds to a row of names extending in one direction, a second group of keys, each of which corresponds to a row of names extending in the other direction, translating switches for initiating the operations incident to setting up calls to different offices, each of said switches having a plurality of ranges of actuation, and connections whereby, in response to the actuation of one combination of keys in the two groups, one of said switches will be actuated within one range, and whereby, in response to the actuation of another combination of keys in the two groups, said switch will be actuated within another range.

In testimony whereof, I have signed my name to this specification this twenty-eighth day of January 1919.

WILLIAM G. BLAUVELT.